(12) United States Patent
Van Deventer et al.

(10) Patent No.: US 11,182,875 B2
(45) Date of Patent: Nov. 23, 2021

(54) COORDINATE MAPPING FOR RENDERING PANORAMIC SCENE

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Mattijs Oskar Van Deventer, Leidschendam (NL); Hendrikus Nathaniel Hindriks, The Hague (NL)

(73) Assignees: KONINKLIJKE KPN N.V., Rotterdam (NL); NEDERLANDSE ORGANISATIE VOOR TOEGEPAST-NATUURWETEN SCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 16/615,763

(22) PCT Filed: May 23, 2018

(86) PCT No.: PCT/EP2018/063434
§ 371 (c)(1),
(2) Date: Nov. 21, 2019

(87) PCT Pub. No.: WO2018/215502
PCT Pub. Date: Nov. 29, 2018

(65) Prior Publication Data
US 2020/0160488 A1   May 21, 2020

(30) Foreign Application Priority Data
May 23, 2017  (EP) .................................... 17172399

(51) Int. Cl.
*G06T 3/00* (2006.01)
*H04N 13/178* (2018.01)
(Continued)

(52) U.S. Cl.
CPC .......... *G06T 3/0087* (2013.01); *G06T 3/0012* (2013.01); *H04N 13/111* (2018.05); *H04N 13/161* (2018.05); *H04N 13/178* (2018.05)

(58) Field of Classification Search
None
See application file for complete search history.

(56) References Cited

U.S. PATENT DOCUMENTS 9,229,790 B2 * 1/2016 Pierson .................. G06F 9/541
9,460,175 B1 * 10/2016 Hong .................... G06F 16/444
(Continued)

FOREIGN PATENT DOCUMENTS

WO    WO 2014/043814 A1    3/2014

OTHER PUBLICATIONS

International Search Report and Written Opinion for Int'l Application No. PCT/EP2018/063434, titled: Coordinate Mapping for Rendering Panoramic Scene, dated Sep. 12, 2018.
(Continued)

*Primary Examiner* — Jwalant Amin
(74) *Attorney, Agent, or Firm* — Hamilton, Brook, Smith & Reynolds, P.C.

(57) ABSTRACT

A projection metadata system and method are provided for providing projection metadata to a rendering system for use in rendering a panoramic scene. A rendering system and method are provided for rendering the panoramic scene using the projection metadata. The projection metadata may comprise machine readable data which may directly provide the coordinate mapping to be used in by the rendering system to render the panoramic scene. For example, an executable script may be provided which, when executed, carries out the coordinate mapping. Compared to known ways of signalling a rendering system which projection to use, which may conventionally involve selecting a projec-
(Continued)

tion from a number of predefined projections and signalling the selection, the use of projection metadata may provide a high degree of flexibility, as different projections may be defined for, e.g., different spatial and/or temporal parts of the panoramic scene, different rendering techniques, etc.

20 Claims, 6 Drawing Sheets

(51) Int. Cl.
*H04N 13/161* (2018.01)
*H04N 13/111* (2018.01)

(56) References Cited

U.S. PATENT DOCUMENTS

| | | | | |
|---|---|---|---|---|
| 10,887,574 | B2* | 1/2021 | Ruhm | H04N 13/275 |
| 2009/0044203 | A1* | 2/2009 | Acker | G06F 9/451 |
| | | | | 719/320 |
| 2010/0259633 | A1* | 10/2010 | Kii | H04N 9/3194 |
| | | | | 348/222.1 |
| 2016/0373734 | A1 | 12/2016 | Cole et al. | |
| 2017/0127032 | A1* | 5/2017 | Takahashi | H04N 21/4223 |

OTHER PUBLICATIONS

Extended European Search for EP Application No. 17172399.2, titled: Coordinate Mapping for Rendering Panoramic Scene, dated Nov. 2, 2017.

Choi, B. et al., "WD on ISO/IEC 23000-20 Omnidirectional Media Application Format," "Information Technology—Coding of audio-visual objects—Part 15: Carriage of network abstraction layer (NAL) unit structured video in the ISO base media file format," 4 pages (Jun. 2016).

Choi, B. et al., "WD on ISO/IEC 23000-20 Omnidirectional Media Application Format," "Information Technology—Multimedia application format (MPEG-A)—Part 20: Omnidirectional media application format," 48 pages (Jan. 2017).

Heckbert, Paul S., Survey of Texture Mapping, IEEE Computer Graphics and Applications, pp. 56-67 (Nov. 1986).

Kuzyakov, E. et al.,"Next-generation video encoding techniques for 360 video and VR," Engineering Blog, Jan. 21, 2016, web post found at https://code.facebook.com/posts/1126354007399553/next-generation-video-encoding-techniques-for-360-video-and-vr/.

Miani, M., TEXample.net, "Example: Spherical and cartesian grids," 5 pages (May 2009).

Progonos.com, "Network Mapping Software, Real Time GPS Navigation, Help Desk Ticketing System," Retrieved from the Internet at: http://www1.progonos.com/?subid4=1573596486&kw=Inte . . . , Retrieved from Internet on: Nov. 12, 2019 (1 page).

Progonos.com, Map Projections: Summary, Retrieved from Internet at: www.progonos.com/furuti, Retrieved from the Internet on: Apr. 20, 2015, 16 pages.

Samsung, 360tools, 3 pages, GITHub (No Date Given).

Spherical Video V2 RFC (draft), Metadata Format, 14 pages (No Date Given).

\* cited by examiner

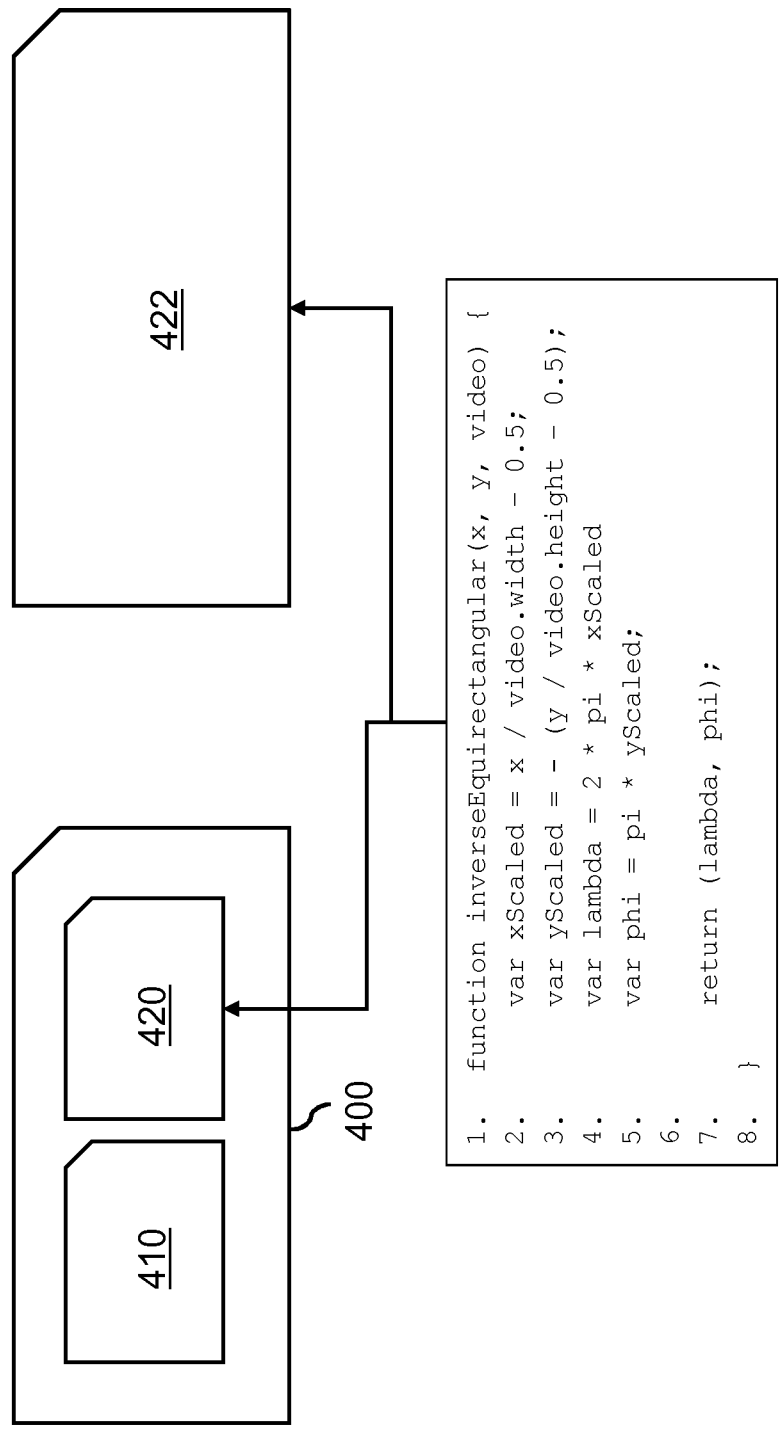

COORDINATE MAPPING FOR RENDERING PANORAMIC SCENE

This application is the U.S. National Stage of International Application No. PCT/EP2018/063434, filed on May 23, 2018, which designates the U.S., published in English, and claims priority under 35 U.S.C. § 119 or 365(c) to European Application No. 17172399.2, filed on May 23, 2017. The entire teachings of the above applications are incorporated herein by reference.

FIELD OF THE INVENTION

The invention relates to a method and system for enabling a rendering system to render a panoramic scene, and to a method and the rendering system for rendering the panoramic scene. The invention further relates to a computer readable medium comprising projection metadata for use by the rendering system to render the panoramic scene. The invention further relates to a computer readable medium comprising a computer program for performing one or more of the methods.

BACKGROUND ART

Virtual Reality (VR) involves the use of computer technology to simulate a user's physical presence in a virtual environment. Typically, VR rendering devices make use of Head Mounted Displays (HMD) to render the virtual environment to the user, although other types of VR displays and rendering techniques may be used as well, including but not limited to holography and Cave automatic virtual environments.

It is known to render a VR image or VR video using such VR rendering devices. The VR image or VR video may show a panoramic scene, with the term 'panoramic scene' referring to, e.g., an at least 180 degree view of a scene. The VR image or VR video may even provide a larger view of the scene, e.g., up to 360 degrees, thereby providing an even more immersive experience to the user.

Panoramic scenes may also be rendered and displayed in an immersive manner which is not conventionally understood as VR. For example, a panoramic scene may be displayed on a curved display, a dome-shaped display, etc. Another example is augmented reality, in which a panoramic scene may be rendered and displayed to augment a live view of a physical, real-world environment.

Generally, rendering a panoramic scene involves projecting image data of the panoramic scene onto a virtual body, such as a sphere, and rendering the panoramic scene from a viewpoint within or facing the virtual body.

For example, a 360° video is usually created by stitching multiple images together, e.g., two 180° images captured using fisheye lenses. When a 360° video is to be rendered, the video images are typically mapped onto a virtual body, which may be a sphere, a box or other geometrical primitive or shape. Having done so, the panoramic scene may be rendered from a viewpoint within or facing the virtual body.

To project the video images onto the virtual body, a projection is used. Such a projection may involve a coordinate mapping from the typically rectangular coordinates of the video image to a coordinate system associated with the virtual body. For example, if the virtual body is a sphere and associated with a spherical coordinate system, the coordinate mapping may map coordinates from the rectangular coordinate system of the video image to the spherical coordinate system, or vice versa.

The coordinate mapping thus may involve projecting the image onto a surface of the virtual body or vice versa depending on which coordinate system is used as input. The projecting of a sphere onto a plane is also encountered in cartography, and many different solutions exist, each with their own advantages and disadvantages and trade-offs between computational complexity, distortion, uniformity, etc.

For example, an equirectangular projection may be used, which is a cylindrical projection in which all meridians and circles of latitude are mapped to straight lines. Due to this straightness, the mathematical definition of the projection may be relatively simple and as a result used in many 360° video encoding systems. A disadvantage of this projection may be the introduction of deformations in the resulting image. As a result, this projection does not preserve scale or distance.

Another example of a known projection is the azimuthal orthographic projection, which is similar to viewing a spherical object from an infinite distance. When projecting a sphere onto a plane using the orthographic projection, straight lines are cast from the plane onto the sphere, resulting in a projection which covers exactly one half of a sphere, e.g. a hemisphere. As such, a second image may be needed to cover the other half of the sphere. A downside of this projection may be the increasing deformations near the edges of the projected image.

Another problem inherent to the discrete representation of images in computer systems is that any distortions caused by a projection may result in a loss of image information. For instance, in a fisheye projection of an input image, an area at the edges of the output image covers a larger area of the input image than the same area in the center of the output image. Given the uniform distribution of pixels in an image, fewer pixels will be available for the image information of the input image at the edges of the output image than in the center.

Various other types of projections exist as well, including but not limited to cube-map projections and pyramidal projections, with the latter being described in Kuzyakov et al., "Next-generation video encoding techniques for 360 video and VR", 21 Jan. 2016, web post found at https://code.facebook.com/posts/1126354007399553/next-generation-video-encoding-techniques-for-360-video-and-vr/.

It is known to signal a rendering device which projection from a number of predefined projections is to be used by the rendering device in the rendering of a particular 360° video. Namely, the MPEG Omnidirectional Media Application Format (MPEG-OMAF), which defines a standard for (the encoding of) 360° video, contains definitions for two categories of projections: 1) equirectangular projections with a configurable rotation of the viewing sphere defined as yaw and pitch angles, and 2) omnidirectional fisheye video supporting any number of circular images. The former is defined as a 'Projected omnidirectional video box', and the latter as a 'Fisheye omnidirectional video box', which may be included in the 'Scheme Information Box'.

A disadvantage of the signalling in MPEG-OMAF in the manner described above is that the signalling is inflexible as it relates to a fixed number of predefined projections.

SUMMARY OF THE INVENTION

It would be advantageous to obtain a signalling to a rendering system on which projection to use in the rendering of a panoramic scene which is more flexible.

The following aspects of the invention involve providing projection metadata to a rendering system for use in rendering a panoramic scene. The projection metadata may comprise machine readable data which may directly provide the coordinate mapping to be used by the rendering system to render the panoramic scene. For example, an executable script may be provided which, when executed, carries out the coordinate mapping. This provides a high degree of flexibility, as different projections may be defined for, e.g., different spatial and/or temporal parts of the panoramic scene, different types of virtual bodies, different rendering techniques, etc.

In accordance with a first aspect of the invention, a method may be provided for enabling a rendering system to render a panoramic scene, wherein the panoramic scene may be represented by at least one image, wherein the rendering system may be configured to project the at least one image onto a virtual body and render the panoramic scene from a viewpoint within or facing the virtual body. The method may comprise:
  providing image data of the at least one image to the rendering system;
  providing projection metadata to the rendering system, the projection metadata comprising machine readable data providing a coordinate mapping to be used by the rendering system to project the at least one image onto the virtual body, the coordinate mapping being between a first coordinate system associated with the at least one image and a second coordinate system associated with the virtual body.

In accordance with a further aspect of the invention, a method may be provided for rendering a panoramic scene, wherein the panoramic scene may be represented by at least one image. The method may comprise:
  obtaining image data of the at least one image;
  obtaining, via a communication interface, projection metadata associated with the image data, the projection metadata comprising machine readable data providing a coordinate mapping to be used to project the at least one image onto a virtual body, the coordinate mapping being between a first coordinate system associated with the at least one image and a second coordinate system associated with the virtual body;
  projecting the at least one image onto the virtual body using the coordinate mapping; and
  rendering the panoramic scene from a viewpoint within or facing the virtual body.

In accordance with a further aspect of the invention, a transitory or non-transitory computer readable medium may be provided comprising projection metadata for use by a rendering system to render a panoramic scene, wherein the panoramic scene may be represented by at least one image, wherein the rendering system may be configured to project the at least one image onto a virtual body and render the panoramic scene from a viewpoint within or facing the virtual body,
  wherein the projection metadata may comprise machine readable data providing a coordinate mapping to be used by the rendering system to project the at least one image onto the virtual body, the coordinate mapping being between a first coordinate system associated with the at least one image and a second coordinate system associated with the virtual body.

In accordance with a further aspect of the invention, a projection metadata system may be provided for enabling a rendering system to render a panoramic scene, wherein the panoramic scene may be represented by at least one image, wherein the rendering system may be configured to project the at least one image onto a virtual body and render the panoramic scene from a viewpoint within or facing the virtual body. The projection metadata system may comprise:
  a data storage storing image data of the at least one image;
  a communication interface for providing the image data and projection metadata to the rendering system, the projection metadata comprising machine readable data providing a coordinate mapping to be used by the rendering system to project the at least one image onto the virtual body, the coordinate mapping being between a first coordinate system associated with the at least one image and a second coordinate system associated with the virtual body.

In accordance with a further aspect of the invention, a rendering system may be provided for rendering a panoramic scene, wherein the panoramic scene may be represented by at least one image. The rendering system may comprise:
  a communication interface configured to:
    obtain image data of the at least one image;
    obtain projection metadata associated with the image data, the projection metadata comprising machine readable data providing a coordinate mapping to be used to project the at least one image onto a virtual body, the coordinate mapping being between a first coordinate system associated with the at least one image and a second coordinate system associated with the virtual body;
  a processor configured to:
    project the at least one image onto the virtual body using the coordinate mapping; and
    render the panoramic scene from a viewpoint within or facing the virtual body.

The above measures involve providing projection metadata to a rendering system. The projection metadata may be associated with image data of a panoramic scene, in that it may define a coordinate mapping to be used to project the image data onto a virtual body which is used in the rendering of the panoramic scene. The coordinate mapping may be provided in the form of machine readable data. As such, the data, when processed by the rendering system or other recipient, may allow the rendering system to carry out the coordinate mapping. A non-limiting example is that the projection metadata may comprise an executable script which, when executed by the rendering system, may calculate the coordinate mapping. For example, the executable script may be executed with an image coordinate as input and provide a virtual body coordinate as output, or vice versa. Another non-limiting example is that the projection metadata may provide a look-up table representing the coordinate mapping, or may directly define the coordinate mapping in another manner.

The inventors have considered that each projection has its own advantages and disadvantages, in that there is no universally 'optimal' projection. As such, the projection should preferably be adapted to the context in which it is being used, which may differ depending on, e.g., which spatial and/or temporal part of the panoramic scene is projected, the type of virtual body, the type of rendering technique, the type of display, etc. By providing projection metadata which provides the projection itself to the rendering system, a high degree of flexibility is obtained. Namely, the projection may be tailored to the specific context, in that a different projection may be provided for, e.g., different spatial and/or temporal parts of the panoramic scene, different types of virtual body, different types of rendering technique, different types of display, etc. An advantage may be that it is not needed to standardize each different type of projection. Rather, it may suffice to standardize the format of the projection metadata, which may then allow projections to be freely defined within the format of the projection metadata.

In an embodiment, the panoramic scene may be part of a panoramic video, wherein the image data may be part of video data of the panoramic video, and the method may comprise:

encoding the video data to obtain encoded video data;
formatting the encoded video data to obtain a stream;
including the projection metadata in the stream; and
providing the stream to the rendering system.

Rather than separately providing the projection metadata to the rendering system, the projection metadata may be included in a media stream which also carries the video data. An advantage of this embodiment is that it is may not be needed for the rendering system or another entity to separately obtain the projection metadata for a particular video or part thereof. Rather, the projection metadata may be obtained inherently together with the video data. Another advantage may be that the inclusion in the same stream may inherently associate the projection metadata with a particular video or part thereof, thereby avoiding a need for the rendering system or other entity to identify which projection metadata is to be used for rendering a particular video.

For example, including the projection metadata in the stream may comprise multiplexing the projection metadata with the encoded video data in the stream.

In an embodiment, the projection metadata may comprise an executable script, and the method may comprise executing the executable script to obtain the coordinate mapping. Effectively, a program or executable function may be provided to the rendering system to enable the rendering system to locally calculate the coordinate mapping by executing the program or calling the function. For example, the executable script may be provided as in the form of JavaScript, Python, Java, GLSL (OpenGL Shading Language) script, etc. Providing an executable script may have advantages over directly defining the coordinate mapping, e.g., by way of a look-up table. For example, an executable script may require less data than a look-up table, as it may merely need to define a mathematic relationship between coordinate systems. Another advantage is that the executable script may allow dynamic behavior during run-time. For example, an executable script may be provided which adapts the coordinate mapping to the type of virtual body, rendering technique or display used by the rendering system. Another example is that the executable script may, during run-time, retrieve information from the internet to adapt or complete the coordinate mapping.

It is noted that the script may be provided in the form of source code which is then compiled by the rendering system before execution, but also in compiled form, e.g., as a binary executable. An advantage of the former may be that the executable script may not be bound to a particular processing architecture or operating system. An advantage of the latter may be an increase in execution speed and/or a reduction in memory usage when executing the executable script in compiled form.

In an embodiment, the executable script may be configured to calculate the coordinate mapping for a given coordinate on the fly during execution, or to pre-calculate the coordinate mapping for all coordinates upon first execution. An advantage of the latter may be that once the coordinate mapping has been pre-calculated, the computational complexity at run-time is relatively low as it may only involve a look-up or similar retrieval of an output coordinate on the basis of an input coordinate.

In an embodiment, the projection metadata may provide a plurality of projections for use with at least one of:

different types of virtual bodies;
different types of rendering techniques by which the panoramic scene is rendered;
different types of displays for which the panoramic scene is rendered;
different spatial parts of the panoramic scene; and
when the panoramic scene is part of a panoramic video, different temporal parts of the panoramic video, such as parts before and after a scene change.

Providing the different projections may involve providing different executable scripts, look-up tables, etc., which each provide a different coordinate mapping. Additionally or alternatively, an executable script, look-up table, etc., may be provided which provides different coordinate mappings. The projection metadata may thus provide different projections, which may be selected by the rendering system but also by another entity such as the executable script itself. This allows the projection to be adapted to the context in which it is being used, including but not limited to the type of virtual body (e.g., sphere or cube-shaped), the spatial part of the panoramic scene (e.g., a different projection for the poles of the sphere than for the equator) or the scene itself (e.g., a different projection before/after a scene change). The projection metadata may thus be used in a range of contexts rather than only in one predetermined context. It is noted that 'different projections' may include the executable script adjusting a first projection during run-time, thereby effectively generating a second projection.

In an embodiment, the projection metadata may comprise a look-up table which provides the coordinate mapping. It may be desirable to directly provide the coordinate mapping to the rendering system in the form of a look-up table or similar form, e.g., when the look-up table is relatively small, when there are few bandwidth constraints, when the rendering system cannot execute an executable script, etc. An advantage of this embodiment may be that the rendering system may not need to be able to execute executable scripts or may disallow such execution, which may improve security and reduce exploitability. Yet another advantage may be that the computational complexity at the rendering system may be reduced since it may not be needed to perform complex calculations at runtime to obtain the coordinate mapping.

In an embodiment, the look-up table may provide a sparse coordinate mapping which is to be interpolated by the rendering system before or when projecting the at least one image onto the virtual body. For example, the coordinate mapping may be provided for a regular or irregular grid of coordinates in the image's coordinate system and/or the virtual body's coordinate system, with the coordinate mapping being obtainable for the remaining coordinates by spatial interpolation. For example, a bilinear, trilinear, bicubic or anisotropic filtering (or interpolation) may be used, e.g., as provided by a graphics processing unit of the rendering system. An advantage of this embodiment may be that the size of the look-up table may be reduced, thereby requiring less bandwidth for transmission to, and less storage at, the rendering system.

It will be appreciated by those skilled in the art that two or more of the above-mentioned embodiments, implementations, and/or aspects of the invention may be combined in any way deemed useful.

Modifications and variations of the method(s), the rendering system, the projection metadata system, the projection metadata and/or the computer program, which correspond to the modifications and variations described for another one of said entities, can be carried out by a person skilled in the art on the basis of the present description. As a non-limiting example, the rendering system may be configured to parse and/or execute, and the projection metadata system may be configured to generate, any of the described projection metadata.

BRIEF DESCRIPTION OF THE DRAWINGS

These and other aspects of the invention are apparent from and will be elucidated with reference to the embodiments described hereinafter. In the drawings.

FIG. 5 shows an example of projection metadata being encoded with image data in a data container, such as a file or a stream, or being separately provided;

Figure 1:
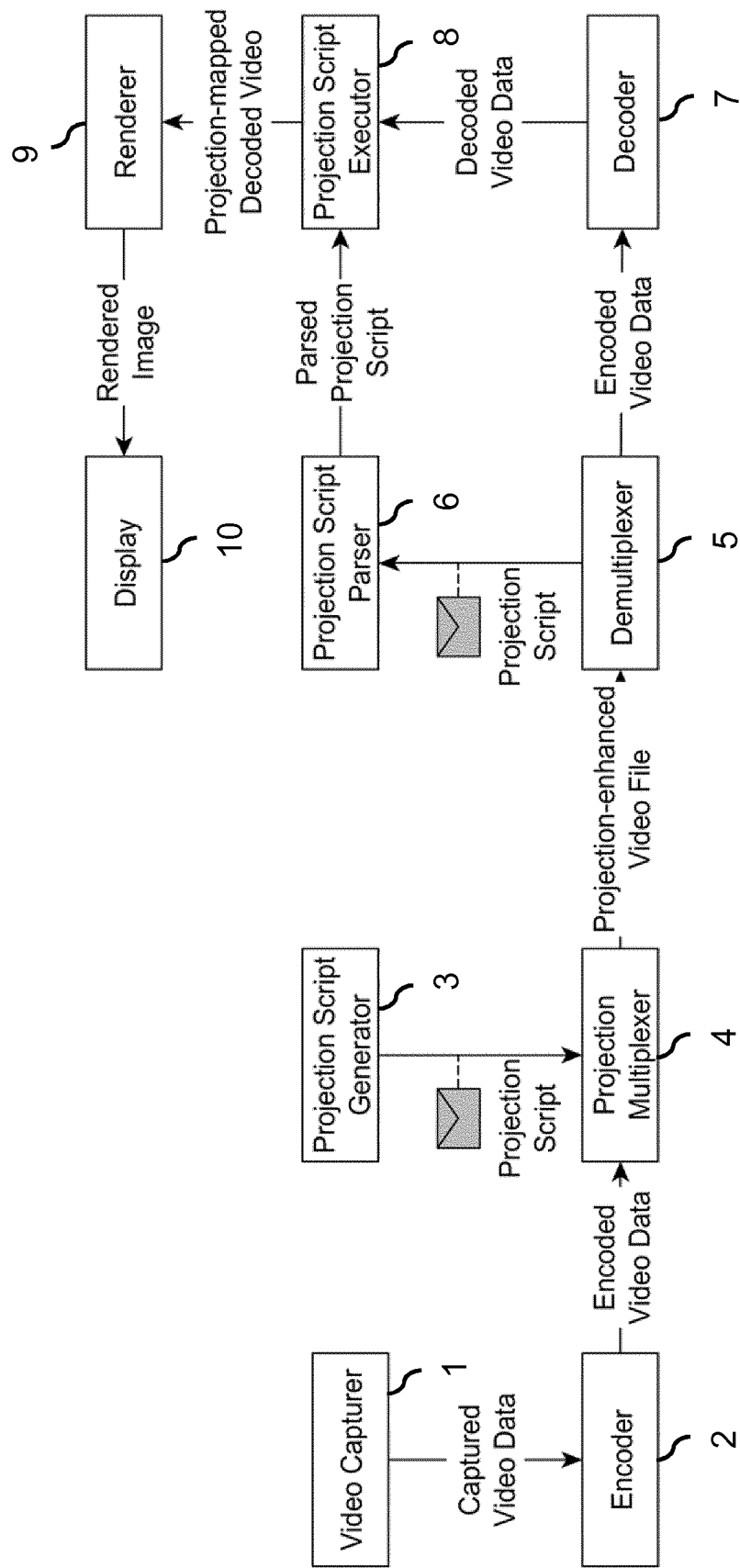
FIG. 1 shows a projection-enhanced video file being generated to comprise projection metadata in the form of an executable projection script, and the executable projection script being parsed and used by a receiver to project decoded video.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

1 video capturer
2 encoder
3 projection script generator
4 projection multiplexer
5 demultiplexer
6 projection script parser
7 decoder
8 projection script executer
9 renderer
10 display
100 projection metadata system for enabling a rendering system to render a panoramic scene
110 data storage
120 communication interface
130 processor
200 rendering system for rendering a panoramic scene
210 communication interface
220 processor
300 network
400 data container
410 image data
420, 422 projection metadata
500 method for rendering a panoramic scene
510 obtaining image data
520 obtaining projection metadata
530 projecting image using projection metadata
540 rendering panoramic scene
600 computer readable medium
610 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

In the following, a number of specific embodiments for providing and using of projection metadata are described with reference to FIG. 1, whereas FIGS. 3-5 relate to more general embodiments of a projection metadata system and a rendering system associated with the projection metadata. Thereafter, various types of projection metadata are described which may be provided by the projection metadata system and used by the rendering system.

The term 'virtual body' may refer to a body which is defined not as a physical entity but rather as a graphical object. The body may be a box, a sphere, a cylinder, etc., and in general may provide a surface onto which one or more images may be projected and which may be rendered from a viewpoint within or facing the body. The graphical object may be defined in any manner known per se, e.g., as a set of coordinates, a wireframe model, a polygon mesh, a volumetric mesh, etc. It is noted that virtual bodies and the rendering are known per se in the field of virtual reality.

The projection may be provided in the form of 'metadata', which may refer to the data providing the projection being associated or associable with the image data.

An embodiment of image data may be video data, as it represents image data of different time instances. As such, any reference to 'image data' may also be understood as a reference to 'video data', and where appropriate vice versa.

The term 'machine readable data providing a coordinate mapping' may refer to the projection metadata, when processed by the rendering system, providing the coordinate mapping as output. Such processing may comprise parsing, e.g., when the projection metadata is an executable script, or code execution, e.g., when the projection metadata is compiled code, or a data look-up, e.g., when the projection metadata is a look-up table. The first two examples may be considered 'programmatically-defined' projections. Various other forms of machine readable data providing a coordinate mapping are conceivable as well. The term may exclude data which is merely indicative of a coordinate mapping without at least partially defining it.

FIG. 1 shows a so-termed 'projection-enhanced video file' being generated. This video file is 'projection-enhanced' as it comprises projection metadata. In this example, the projection metadata is an executable script which may be parsed and used by a rendering system to project decoded video onto a virtual body.

FIG. 1 may be explained with reference to the following steps, of which their numbering is associated with the reference numerals of functional entities shown in FIG. 1. As will also be explained later, the functional entities of FIG. 1 may be embodied by different types of systems and devices. In general, however, functional entities 1-4 may be considered to represent a 'generating side', in which selected functional entities may be embodied by systems and devices such as servers, content generating devices such as cameras, etc. Likewise, functional entities 5-10 may represent a 'receiving side', in which selected functional entities may be embodied by systems and devices such as set-top boxes, game consoles, smartphones, personal computers, laptops, tablet devices, televisions, monitors, projectors, media players and recorders, etc. A system may be considered a rendering system if it embodies at least functional entity 9.

FIG. 1 may be explained as follows.

1. A panoramic video may be captured by a video capturer 1.

2. The captured video data may then be received and encoded by an encoder 2 which may generate encoded video data as output.

3. A projection script may be generated by a projection script generator 3. For example, the projection script may have the form of a JavaScript program, and define a projection for the whole panoramic video.

4. A projection multiplexer 4 may encapsulate the encoded video data and the projection script into a projection-enhanced video file.

The projection-enhanced video file may be provided to a receiver which comprises a demultiplexer 5, e.g., via a network or other communication channel.

5. The demultiplexer 5 may demultiplex the projection-enhanced video file into the projection script and the encoded video data.

6. The projection script may be parsed by a projection script parser 6 and provided for execution to a projection script executor 8.

7. In parallel with steps 5 and 6, the encoded video data may be provided to a decoder 7, which may decode the encoded video data to obtain decoded video data and provide the decoded video data to the projection script executor 8 (which in some embodiments may also be included in the decoder 7).

8. The projection script executor 8 may receive the projection script and the decoded video data and execute the projection script with the decoded video data as input. The projection script may apply a projection to the decoded video data, which may result in a projection-mapped decoded video. The projection script executor 8 may pass the projection-mapped decoded video to a renderer 9.

9. The renderer 9 may render the projection-mapped decoded video. The resulting rendered image may be sent to a display 10.

10. The rendered image may be shown on the display 10.

With continued reference to FIG. 1, in an even more specific embodiment the above steps may be carried out as follows. Here, the functional entities 1-4 are embodied by a content generating device, being in this example a Samsung Gear 360 camera, whereas functional entities 5-9 are embodied by a rendering system which is configured for parsing and executing JavaScript programs. Functional entity 10 may be a display connected to the rendering system, such as a head-mounted display.

1. A 360° video may be captured using a Samsung Gear 360 camera. Due to the configuration of its lenses, the resulting images may have an equirectangular projection with respect to the canvas of the image.

2. The images from the sensor, e.g., the captured video data, may be encoded by the camera according to the HEVC/H.265 standard.

3. The Samsung Gear 360 may generate a projection script. The script may have the form of a JavaScript program, and may define an (inverse) equirectangular projection for the whole video as shown below:

```
1    function inverseEquirectangular(x, y, video) {
2        var xScaled = x / video.width - 0.5;
3        var yScaled = - (y / video.height - 0.5);
4        var lambda = 2 * pi * xScaled
5        var phi = pi * yScaled;
6
7        return (lambda, phi);
8    }
```

The first line of the Projection Script defines that the script expects a coordinate pair (x,y) from the original video, and a video object which provides metadata of the video. In lines 2 and 3 of the script, the x and y coordinate pairs are scaled in the range [−0.5, 0.5], and the y-coordinate is mirrored to ensure that image data from the top of an image is projected to the top of the sphere, and likewise for the bottom of the image data. Lines 4 and 5 of the script calculate the horizontal (lambda) and vertical (phi) angles which define the point on a sphere to which the (x,y) coordinates should be mapped. Because this is an equirectangular projection, this amounts to scaling the pre-scaled x-coordinate to the range [−π, +π] and scaling the pre-scaled y-coordinate to the range [−0.5 π, +0.5 π], thereby ensuring that all vertical parts of the sphere are covered. Line 7 specifies that the calculated sphere angles, e.g., lambda and phi, should be returned to the projection script executor.

4. The projection multiplexer may encapsulate the HEVC/H.265 encoded video data and the projection script into an MP4-file.

The MP4-file may be sent to a receiver which comprises a demultiplexer.

5. The demultiplexer may split the MP4-file into the projection script and the HEVC/H.265 encoded video data.

6. The JavaScript program may be parsed by a parser, such as the Spidermonkey JavaScript engine, and prepared for execution. When this step is completed, the parsed projection script may be sent to the projection script executor.

7. In parallel with steps 5 and 6, the HEVC/H.265 encoded video data may be sent to a decoder which may decode the encoded video data to obtain decoded video data. The decoded video data may then be sent to the projection script executor.

8. The projection script executor may receive the parsed projection script and the decoded video data, and use the Spidermonkey JavaScript engine to execute the projection script with the decoded video data as its input.

The projection script may calculate a projection for the decoded video data on the basis of the width and height of the decoded video data, resulting in a list of mappings from (x, y) coordinate pairs to (lambda, phi) spherical angles. The video image may be sent with the mappings to the renderer.

9. The renderer may render the projection-mapped decoded video, projecting the image data onto a virtual sphere. As the user may only view a part of the sphere, the renderer may only render this part of said sphere.

10. The rendered image may be shown on the display.

Figure 2:
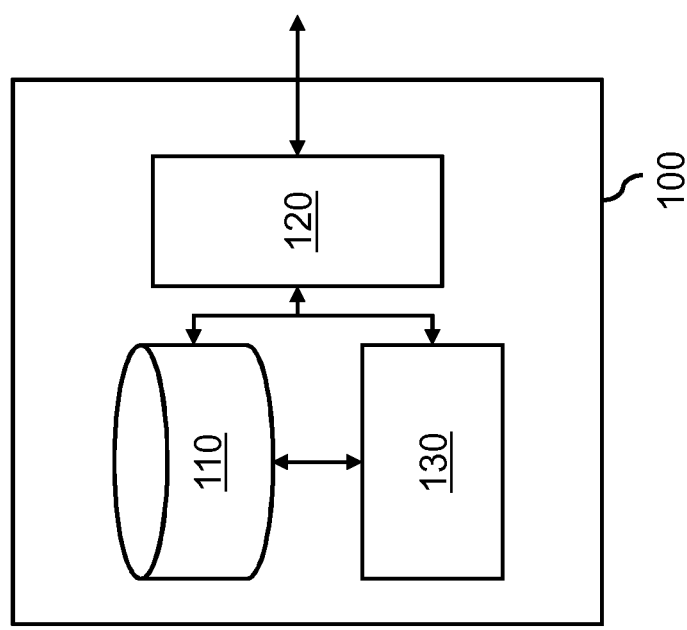
FIG. 2 shows an embodiment of a projection metadata system for providing projection metadata to the rendering system to enable a rendering system to render a panoramic scene.

FIG. 2 shows an embodiment of a projection metadata system 100 for providing projection metadata to a rendering system to enable the rendering system to render a panoramic scene represented by image data. The projection metadata system is shown to comprise a data storage 110 for storing image data of at least one image, and a communication interface 120 for providing the image data and projection metadata to a rendering system.

The data storage 110 of the projection metadata system 100 may take various forms, including but not limited to volatile and non-volatile memory, a hard drive or an array of hard drives, a solid-state drive or an array of solid state drives, etc. Likewise, the communication interface 120 may take various forms, such as a network interface to a local or wide area network, e.g., the Internet, a mobile communications interface to a mobile network, e.g., a 4G or 5G network, a storage interface to an internal or external data storage, etc. The term "providing ( . . . ) to a rendering system" may thus include the projection metadata system 100 providing the projection metadata to the rendering system via a network such as the Internet, but also via a physical storage medium, such as a Blu-ray or USB drive.

The projection metadata may be generated in the form of machine readable data providing a coordinate mapping to be used by the rendering system to project the at least one image onto the virtual body. In some embodiments, the projection metadata system 100 may generate the projection metadata itself. Example embodiments may include an authoring workstation, a server, a content creation device such as a camera, etc. In some embodiments, the projection metadata system 100 may be a processor system configured to execute software performing the described functionality. For example, as software, a video encoding program may be provided, which generates both an encoded video and a projection script. Another example is a stitching program which creates an omnidirectional image based on multiple input images, and in which the creation of this image is performed implicitly by the stitching program generating an appropriate projection script. Yet another example may be a virtual camera-type 3D computer application which may generate and record image data based on certain virtual camera properties. The virtual camera-type 3D computer application may generate a projection script to match these properties.

In such embodiments, the projection metadata system 100 may comprise a processor 130 configured for generating the projection metadata. The processor 130 may internally communicate with the data storage 110 and the communication interface 120. For example, the processor 130 may be configured to perform the function of projection script generator as described with reference to FIG. 1. The projection metadata may be generated automatically by the processor 130. For example, in a camera, the projection metadata may be automatically generated based on internal gyroscope readings. Another example is that a (moving) point of interest may be detected in a video. The video may then be re-encoded using a projection which dedicates more data to the (moving) point of interest, and less to the other areas of the original video. During the re-encoding, the projection may be specified by generating a corresponding projection script. Yet another example is that if a (virtual or real) camera dynamically changes its lens parameters, e.g., by swapping or by morphing its lens, the recorded image may be affected. These dynamic parameters may be used to generate a matching projection script for each image. The projection metadata may also be generated semi-automatically or manually based on user input. For example, if the projection metadata system is an authoring workstation, the projection metadata may be generated based on user input from a user, e.g., based on a manual selection of the type of projection to be used by the user in a graphical user interface.

In some embodiments, the projection metadata system 100 may not generate the projection metadata itself but rather obtain the projection metadata from another entity, e.g., the aforementioned projection script generator, yet provide the projection metadata to the rendering system in a specific manner. For example, the projection metadata system 100 may multiplex the projection metadata with the image data. For this and similar purposes, the projection metadata system 100 may comprise a processor 130 which may communicate with the data storage 110 and the communication interface 120. In a specific example, the processor 130 may be configured to perform the function of projection multiplexer as described with reference to FIG. 1. The projection metadata system 100 may also provide the projection metadata to the rendering system in various other ways, e.g., via separate signalling such as the providing of a separate ISO BMFF (Base Media File Format) file containing the projection metadata. Another example is the use of an external orchestration server, which provides a projection script to use for a given image or video. Yet another example is a projection script generator server/service, which may be queried by a rendering system to calculate/generate a suitable projection script for a given image or video. In general, the projection metadata system 100 may be embodied as any suitable entity, such as device or apparatus, or a centralized or distributed system of such entities. In a specific example, the projection metadata system 100 may be a network element such as a network cache, a network proxy, etc.

Figure 3:
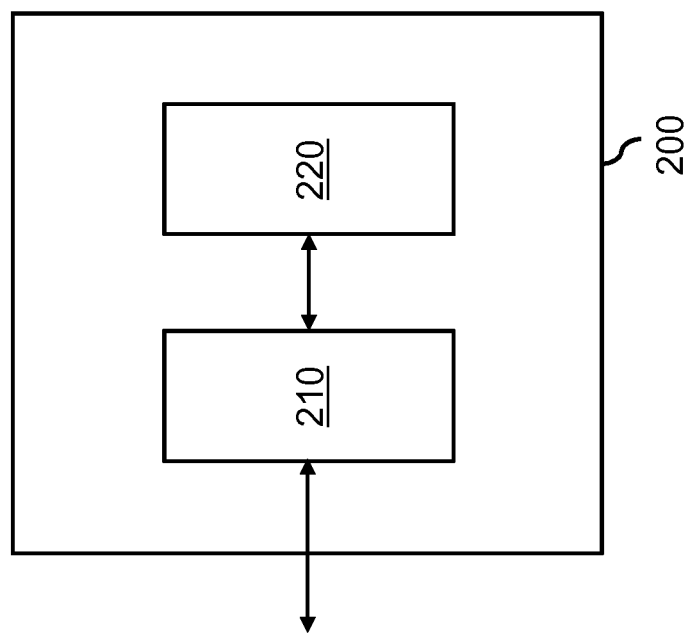
FIG. 3 shows an embodiment of the rendering system.

FIG. 3 shows an embodiment of a rendering system 200. The rendering system 200 is shown to comprise a communication interface 210 configured to obtain the image data and the projection metadata associated with the image data, and a processor 220 configured to project at least one image onto a virtual body using the coordinate mapping provided by the projection metadata, and to render the panoramic scene represented by the at least one image from a viewpoint within or facing the virtual body. The communication interface 210 may take various forms, such as a network interface to a local or wide area network, e.g., the Internet, a mobile communications interface to a mobile network, e.g., a 4G or 5G network, a storage interface to an internal or external data storage, etc. The processor 220 may be configured by software to perform the described functions. For example, the software may be stored in a memory of the rendering system 200 (not shown in FIG. 3). Although not shown explicitly in FIG. 3, the rendering system may comprise a display output to output rendered images to a display. Examples of rendering systems include devices such as set-top boxes, game consoles, smartphones, personal computers, laptops, tablet devices, televisions, monitors, projectors, media players and recorders, etc. The rendering system may also be comprised of two or more of such devices, which are connected via a communication interface such as HDMI, USB, etc. In such cases, the coordinate mapping may be calculated by one device while the rendering may be performed by another device. The display may be an external display or an internal display (e.g. outside of resp. part of the rendering system), and in general may be head-mounted or non-head-mounted. Examples of the former include the GearVR, HTC Vive, Oculus Rift and Playstation VR virtual reality headsets and augmented reality headsets such as Google Glass and Microsoft HoloLens. Examples of the latter included panoramic and curved displays. In general, the display may be monoscopic, stereoscopic or holographic or of another type.

Figure 4:
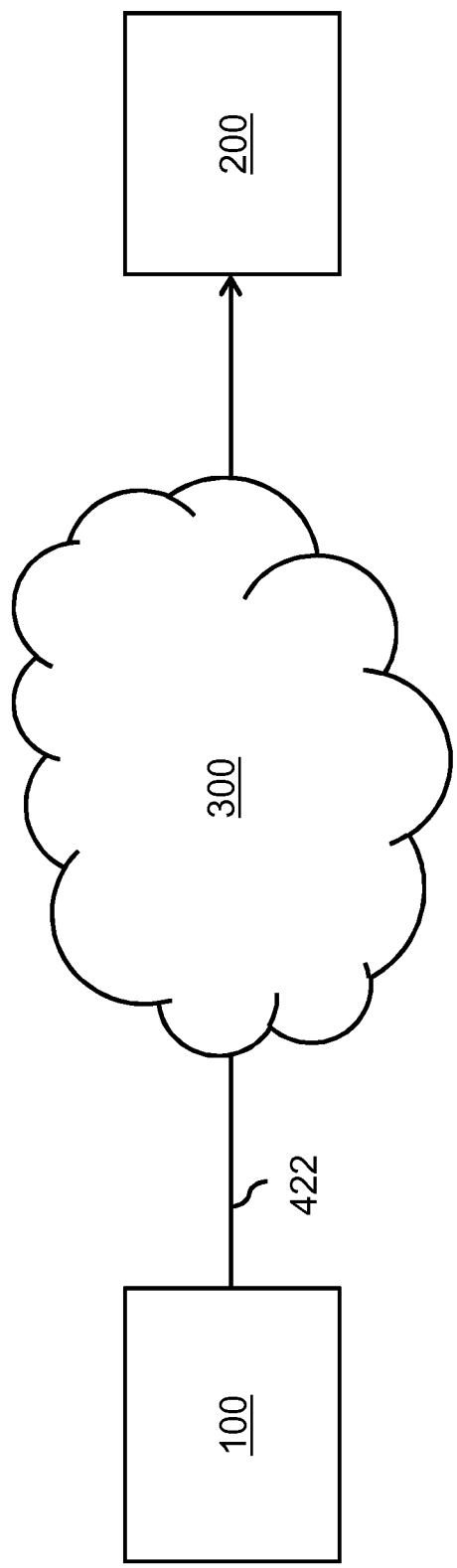
FIG. 4 shows the projection metadata system providing projection metadata to the rendering system via a network such as the internet.

FIG. 4 shows the projection metadata system 100 providing the projection metadata 422 to the rendering system 200 via a network, being in this example the Internet 300. However, as previously described, this is not a limitation, in that the projection metadata may also be provided to the rendering system 200 in various other ways, e.g., via different types of networks, via physical storage mediums, etc.

FIG. 5 shows projection data, being in this example the JavaScript program previously described with reference to FIG. 1, provided as projection metadata 420 together with image data 410 in a data container 400, such as a file or a stream. For example, if the image data 410 and the projection metadata 420 are contained in a same ISO BMFF file, then identifier mechanisms within ISO BMFF may associate the projection metadata 420 with the image data 410. The projection metadata may also be provided via a separate route to the rendering system, e.g., in a separate data container 422. In this case, the projection metadata 422 may be associated or associable with particular image data by identifiers, e.g., at application level. For example, HbbTV (Hybrid broadcast broadband TV) has mechanisms to distribute an app and to combine, e.g., video from broadcast with audio via internet. Such and similar mechanisms are known to and within reach of the skilled person.

In some embodiments, the projection metadata may comprise or be constituted by an executable script, e.g., a 'projection script', which may be defined using different mechanisms and languages. Such projection scripts may define projections which are not currently supported by standards such as MPEG-OMAF and which may provide dynamic functionality, including but not limited to the retrieval of configuration parameters from a website. The following provides several examples of specific combinations of script language, projection type and dynamic functionality, but which are not to be understood as limiting the invention as claimed.

Java

In this example, a stateful execution environment is assumed for the projection script, in that values set during earlier invocations of the projection script are carried onto following invocations, and that the projection script keeps track of timing. The following script uses these features to implement a rotation animation.

```
1    class Rotate implements Projection {
2        public static final int FPS = 30;
3        public static final double ROTATION = (2 * Math.PI) / FPS;
4        private Long timestamp = null;
5
6        @Override
7        public SphereAngles project(float x, float y, Context c){
8            double factor = 1.0;
9            long newtime = System.nanoTime( );
10           if(timestamp != null){
11               long timedifference = newtime - timestamp;
12               factor = timedifference / (Math.pow(10,9) / FPS) ;
13           }
14           timestamp = newtime;
```

-continued

```
15           return new SphereAngles(
16               c.getPreviousLambda( ) + factor * ROTATION,
17               c.getPreviousPhi( )
18           );
19       }
20   }
```

Line 1 defines a Java class which implements the Projection interface. This means that this class may exhibit all behavior and properties defined in said interface. In this example, this is the project(x,y,c) function.

Lines 2-3 define a constant indicating the framerate and the rotation per frame (1 rotation per second). Line 4 defines the transient state of the projection script, which is used to keep track of the duration between invocations.

Lines 6-19 comprise the projection function. It takes the two image coordinates as input, and a context object, of which we assume that it contains more state variables (in particular the previous rotation state) and metadata of the video.

Lines 8-14 take care of recording the time between frames, and calculating the required rotation based on the defined constants.

Lines 15-18 construct an object containing the rotation angles (Java does not support returning multiple arguments), and calculate the new lateral rotation based on the values calculated in lines 8-14.

Python

```
1    import urllib.request as rq
2    import json
3    import projections
4
5    def myProjection(x, y, video):
6        data = {"translation": (-10,100)}
7        with rq.urlopen("tno.nl/projection_of_the_day") as config:
8            data = json.load(config)
9            dx, dy = data["translation"]
10           newx,newy = x + dx, y + dy
11           lambda = 2 * pi * (x / video.width - 0.5)
12           phi = pi * (0.5 - y / video.height)
13           return lambda, phi
14
15   projections.registerProjection(myProjection)
```

Lines 1-2 load libraries from the Python environment. Line 3 loads a fictive 'projections' library, which may be used to register the projection later on.

The projection is defined in lines 5-13. Starting with lines 6-9, the script downloads configuration parameters from a website. These parameters are applied in line 10. Lines 11-13 perform the same function as the previous JavaScript example, in that they calculate projection angles according to an inverse equirectangular projection.

Line 13 returns the results of the calculation.

Line 15 registers the projection using the 'projections' library.

GLSL

On a lower level of abstraction, a projection script may also be implemented as a graphics shader, which allows to directly program graphics processing for a graphics card, thereby allowing integration into existing video decoders.

The following is an example of a projection script in GLSL, which is developed for OpenGL and is somewhat similar to C. This particular script is a vertex shader, meaning that it is able to access and manipulate vertex data only.

```
1   #version 330 core
2
3   layout(location = 0) in vec3 vertexPosition_modelspace
4   out vec2 UV;
5   uniform mat4 MVP;
6
7   void main( ){
8       gl_Position = MVP * vec4(vertexPosition_modelspace,1);
9       UV = vec2(0.5, 0.5) + vertexPosition_modelspace.xy;
10  }
```

Line 1 defines that the minimum required version of OpenGL is 3.3 Lines 3-4 specify the input and output to the shader. The script receives vertices as input, and outputs UV coordinates, which are used to locate the position of colors for each vertex of a 3D model within an image. This program is intended to overwrite an existing shader program, therefore, lines 5-8 define a number of default 3D rendering steps.

Finally, line 9 performs the actual projection, casting 3D coordinates from an input sphere onto a 2D image.

Dodecahedral Projection Script

This projection script is written in Python and assumes:

A predefined scalable lay-out of 12 pentagons on a rectangle

The image data from a rectangular video is projected onto a dodecahedron (in this example, the encompassing sphere has a radius of $\sqrt{3}$).

As a reminder, the corner coordinates of a 3D dodecahedron with sides of length $\sqrt{5}-1$ are defined as follows (line 24 uses 5 coordinates from this list):

coordinates=[(−1, −1, −1), (−1, −1, 1), (−1, 1, −1), (−1, 1, 1), (1, −1, −1), (1, −1, 1), (1, 1, −1), (1, 1, 1), (0, 1/PHI, PHI), (0, 1/PHI, −PHI), (0, −1/PHI, PHI), (0, −1/PHI, −PHI), (1/PHI, PHI, 0), (1/PHI, −PHI, 0), (−1/PHI, PHI, 0), (−1/PHI, −PHI, 0), (PHI, 0, 1/PHI), (PHI, 0, −1/PHI), (−PHI, 0, 1/PHI), (−PHI, 0, −1/PHI)]

```
1   import math
2   from shapely.geometry import LinearRing, Point
3   import shapely.affinity as afft
4
5   PHI = (1+math.sqrt(5)) / 2
6
7   def sphereAngles(x, y ,z):
8       r = math.sqrt(x**2 + y**2 + z**2)
9       phi = math.atan(y / x)
10      theta = math.acos(z / r)
11      return {"phi" : phi, "theta" : theta}
12
13  def generatePentagon(x = 0, y = 0):
14      c1 = math.cos(2*math.pi/5)
15      c2 = math.cos(math.pi/5)
16      s1 = math.sin(2*math.pi/5)
17      s2 = math.sin(4*math.pi/5)
18
19      return afft.translate(LinearRing([[-s1, c1], [0, 1], [s1, c1], [s2, -c2] [-s2 -c2]]),
20          xoff=x + s1,
21          yoff=y + c2)
22
23  threeDimensionalFaces = [
24      LinearRing([(1,1,-1), (1/PHI, PHI, 0), (1,1,1), (PHI, 0, 1/PHI), (PHI 0 -1/PHI)])
25  ]
26  twoDimensionalPentagons = [
27      generatePentagon( )
28  ]
29
30  threeDimensionalFaceAngles = [[sphereAngles(point[0],point[1],point[2]) for point in face.coords] for face in threeDimensionalFaces]
31
32  twoDimensionalFaceAngleLookup = [
33      threeDimensionalFaceAngles[0]
34  ]
35
36  def dodecahedralProjection(x, y, image):
37      intersectingPentagon = next(
38          filter(lambda pentagon: pentagon.intersects(Point(x,y)), iter(twoDimensionalPentagons))
39          , None)
40      if(intersectingPentagon is not None):
41          distances = [math.sqrt((x-coord[0])**2 + (y-coord[1])**2)
42              for coord in intersectingPentagon.coords]
43          distances = [1 − distance/sum(distances) for distance in distances]
44          angles = twoDimensionalFaceAngleLookup[
45              twoDimensionalPentagons.index(intersectingPentagon)
46          ]
47          scaledAngles = [(angles[index]["phi"] * scale, angles[index]["theta"] * scale) for
48              (index, scale) in enumerate(distances)]
49
50          phi, theta = (0, 0)
51          for sphi, stheta in scaledAngles:
52              phi, theta = (phi + sphi, theta + stheta)
53          return phi, theta
```

```
54          else:
55              return (None, None)
```

Lines 1-3 request a number of libraries used to perform computations.

Line 5 calculates the golden ratio.

Lines 7-11 define a helper function, used to calculate the phi and theta angles on a sphere for a given 3D-coordinate (x,y,z) on said sphere (which has the radius according to the length of the vector (x,y,z)).

Lines 13-21 define a helper function used to generate the coordinates of a pentagon, which may be translated.

Lines 23-25 define the 12 faces of a 3D dodecahedron (for brevity only a single face is specified).

Lines 26-28 define the 12 2D pentagons corresponding to the 12 dodecahedron faces (for brevity only a single pentagon is specified).

Line 30 calculates the sphere angles of each vertex of each face of the dodecahedron; the sphereAngles helper function is used for this.

Lines 33-35 provide a mapping (by index, other mapping mechanics may also be used) of the pentagons to the dodecahedrons.

Lines 36-55 define the actual projection function.

Lines 37-40 determine whether the provided x-y coordinate lies within one of the 12 pentagons. If this is not the case, an empty result (line 55) is returned. If such a pentagon is found, the script continues at line 41.

Lines 41-43 calculate the distance from the provided x-y coordinate to each vertex of the pentagon. The distances are normalized such that they add up to 1 which is advantageous for the linear scaling later on.

Lines 44-48 map the vertices of the pentagon to the associated angles of the dodecahedron. The angles are then scaled according to the normalized distances calculated in lines 39-40.

Lines 50-52 sum the scaled angles, resulting in the original angles being interpolated.

Finally, in line 53 the calculated angles are returned.

All these coordinates lie on a sphere (albeit not a unit sphere, it is currently not required to adapt these coordinates, although it is straightforward to scale them, as they share the same origin), which means that spherical angles for each vertex may be calculated. Any x-y coordinate from a video which falls into one of the 12 pentagons may be mapped to one of the 12 faces of a dodecahedron. This script uses linear interpolation to calculate the spherical angles (phi, theta) corresponding to each requested coordinate (x-y). Other types of interpolation may be used as well.

Sphere-to-Plane Projection Script

Alternatively or additionally to plane-to-sphere projections, projection scripts may also be used to describe a projection from a sphere to a plane. This may be advantageous if the projection environment needs to determine the pixel corresponding to a point on the viewing sphere. The projection script below implements Braun's stereographic projection, which is a projection from the family of cylindrical projections. This projection is achieved by wrapping a cylinder around the projection sphere, and for each point on the sphere determining the point on the sphere opposite of this point. After the projection, the cylinder is cut and unwrapped, resulting in a plane.

```
1    import math
2
3    def projectCylindricalStereographic(phi, theta, video):
4        x = video.width * theta / (math.pi * 2)
5        y = video.height * -(0.5 + 0.5 * math.tan(phi/2))
6        return x, y
```

Line 1 specifies that the math library is used.

Line 3 defines the projection script function, which expects a pair of spherical angles, and a video object containing information about the source video.

Line 4 calculates the x-coordinate of the video corresponding to the provided angles. As a cylindrical projection is used, this amounts to linear scaling of the theta angle (which is in the range [0,2π]) to the range [0,w] with w the width of the source video.

Line 5 calculates the y-coordinate of the video corresponding to the provided angles. The tan function is used, which returns values in the range [−1,1], which is then scaled to the range [0,h], with h the height of the video. The value is also inverted to match the coordinate system of videos (which have an inverted y-axis).

Finally, line 6 returns the calculated coordinate pair corresponding to a point on the video plane. Note that these values are not necessarily integers, and may need interpolation in order to obtain a truthful sample from the source image. As this may be beyond the scope of projection, this step is not performed by the projection script.

Lookup Table Projection

This projection script written in Python assumes a statically sized lookup table for a predefined input resolution. This assumption is made to simplify the script, but may not be required depending on the style of the implementation. For instance, it is possible to start populating the lookup table as soon as the input resolution is known.

```
1    def inverseEquirectangular(x, y, video):
2        xScaled = x / video["width"] - 0.5
3        yScaled = - y / video["height"] - 0.5
4        return {
5            "lamda" : 2 * math.pi * xScaled,
6            "phi" : math.pi * yScaled
7        }
8
9    LOOKUP_TABLE_WIDTH = 1920
10   LOOKUP_TABLE_HEIGHT = 1080
11
```

```
12    lookupTable = [ ]
13    for x in range(0,LOOKUP_TABLE_WIDTH):
14        for y in range(0,LOOKUP_TABLE_HEIGHT):
15            lookupTable[x + LOOKUP_TABLE_WIDTH * y] = inverseEquirectangular(x, y, {
16                width : LOOKUP_TABLE_WIDTH,
17                height: LOOKUP_TABLE_HEIGHT
18            })
19
20    def project(x, y, video):
21        return lookupTable[x + y * LOOKUP_TABLE_WIDTH]
```

Lines 1-7 provide a projection function defining a coordinate mapping. It is noted that any other type of projection function may be used as well here.

Lines 9, 10 define a static lookup table (grid) size.

Lines 13-18 populate the lookup table by executing the pre-defined projection function for each coordinate in the grid.

Lines 20-21 define a lookup table-based projection function which provides the coordinate mapping by look-ups in the lookup table after it has been populated, e.g., during run-time. It is noted that the coordinates could be scaled prior to a look-up if an input video is provided with a different size than the lookup table.

In an alternative embodiment, the lookup table itself may be provided as projection metadata to the rendering system. For example, the above script or similar function may be executed at the content generating side, with the resulting look-up table then being encoded as projection metadata and provided to the rendering system.

Projection Switch Use-Cases

In general, different projections may be used for different use-cases, e.g., different types of virtual bodies, different types of rendering techniques by which the panoramic scene is rendered, different types of displays for which the panoramic scene is rendered, different spatial parts of the panoramic scene, and when the panoramic scene is part of a panoramic video, different temporal parts of the panoramic video, such as parts before and after a scene change. Such different projections may be, for example, defined separately by the projection metadata, dynamically generated by the projection metadata, provided as separate projection metadata, etc. Accordingly, the projection may be 'switched' in an adaptive manner, e.g., depending on use-case.

The following provides examples of such different use-cases and how different projections may be used in the respective use-case.

Live-streaming, camera switch: During the live-streaming of a music event, a director may decide to switch from a 360° camera on the stage to a 360° camera behind the drummer. This camera may be of a different brand, and may encode its video using a different format which happens to use a different projection. Accordingly, a different projection script may be provided with the video stream to the rendering system when the camera is switched from on the stage to behind the drummer.

Area-of-interest tracking: In this example, a multiple cameras setup is assumed, such as a Nokia Ozo, whose images are stitched and therefore projected during recording. The director may instruct the stitching software to optimize the current projection to ensure that the current area of interest is the least distorted/deformed due to the projection. For example, at the start of a scene, an equirectangular projection may be used to allow the user to freely look around and have average image quality in all forward directions. As soon as a person of interest enters the scene, the projection may be changed to a pyramid projection which is focused at the person of interest. This may ensure that the person of interest and surrounding area are clearly visible.

Reducing deformations in panels: Rectangular objects, such as billboards, documents, text, etc., may always be deformed when projected onto a sphere. In order to reduce the deformation during encoding, such objects may be encoded as a non-projected part of the image, e.g., using a non-spherical orthogonal projection. A case where this is possible is when adding rendered overlays to a video. The projection script, which may be included in the video as well, may be specified to take advantage of this encoding and thereby reduce the visual distortion of the rectangular objects.

Time Parametrized Projection Script

As an example of dynamic or adaptive behavior of projection scripts, a projection script may take the current playback time into account. The example below uses the time to use an equirectangular projection during the first four seconds of the video, and switches to a cylindrical stereographic projection after that. Furthermore, the cylindrical projection rotates its cutting point along the poles of the projection sphere.

In this example, the time parametrization is implemented by assuming that the scripts are provided a timestamp value corresponding to the amount of milliseconds passed since the start of the video.

```
1     import math
2
3     rotationtime = 5
4     switchtime = 4000
5
6     def project(phi, theta, time, video):
7         if(time < switchtime):
8             return equirectangularOrthogonal(phi, theta, time, video)
9         else:
10            return cylindricalStereographic(phi, theta, time - switchtime, video)
11
12    def cylindricalStereographic(phi, theta, time, video):
```

```
13         rotation = 2 * math.pi * ((time / 1000) % rotationtime) / rotationtime
14         x = video.width * (theta + rotation) / (math.pi * 2)
15         y = video.height * -(0.5 + 0.5 * math.tan(phi/2))
16         return math.round(x), math.round(y)
17
18     def equirectangularOrthogonal(phi, theta, time, video):
19         x = video.width/2 * (0.5 + 0.5 * math.cos(phi) * math.cos(theta))
20         y = video.height * -(0.5 + 0.5 * math.cos(phi) * math.sin(theta))
21         if(phi<0):
22             x = x + video.width / 2
23         return x, y
```

Line 1 specifies that a math library is used

Line 3 defines how fast the rotation of the cylindrical projection should be by denoting the desired time in seconds.

Line 4 defines the time at which the projection should be switched, which is here assumed to be in milliseconds but may in general be any type of time unit.

Lines 6-10 test whether the switching time has occurred, and selects the correct projection accordingly. The input parameters are passed to the other projections unmodified, except for the time parameter. For this parameter, the switching time is subtracted in order to shift the cylindrical timeline by the waiting time.

Lines 12-16 implement the cylindrical projection known as Braun's projection (see 'Sphere-to-plane projection script' for a more in-depth explanation).

Lines 18-23 define a sphere-to-plane equirectangular orthogonal projection. The source video is assumed to contain two side-by-side hemisphere. Therefore, the x-coordinate is scaled to half the video width in line 19. Lines 21-22 select the correct hemisphere, based on the input longitudinal angle. The left side of the image contains the image data for the upper hemisphere, whereas the right side is used to the lower hemisphere.

Projection Script Interface

To ensure correct communication between different software entities, the concept of interfaces may be used to define a common format for the exchange of messages. Interfaces are found explicitly in many high-profile object-oriented languages (e.g. Java, PHP, Python and C#).

As a non-limiting example, the following interface may be used for projection scripts, being in this example specified in the style of Java:

```
1     interface Projection {
2         public SphereAngles project(float x, float y, Context c);
3     }
```

Line 1 states that this file describes an interface with the name 'Projection'.

Line 2 states that any object which implements, e.g., supports, this interface should provide a publicly accessible function named 'project'. This function should receive two floats (x and y) and an object which inherits the Context type (it is assumed that this type defines a class which has methods to query the state and properties of the source video). Finally, the function should return a SphereAngles object as a result, or an empty result (known as 'null').

The SphereAngles object defines an immutable object, which is used to store the output angles. This class may be defined as follows:

```
1     class SphereAngles {
2         private final float phi;
3         private final float theta;
4
5         public SphereAngles(float phi, float theta){
6             this.phi = phi;
7             this.theta = theta;
8         }
9
10        public float getPhi( ) {
11            return this.phi;
12        }
13
14        public float getTheta( ) {
15            return this.theta;
16        }
17    }
```

Lines 2 and 3 define two internal immutable (that is, after initialization) data fields named 'phi' and 'theta' which are defined as floating-point numbers. These data fields may be used to store the angles used to define points on a sphere.

Lines 5-8 comprise the constructor of the SphereAngles class, which initializes an instance of this class with the provided angles.

Lines 10-12 and 14-16 define two publicly accessible methods which may be invoked to obtain the value of the angles.

As another non-limiting example, in the case of sphere-to-plane projections, the following interface may be used, again specified in the style of Java:

```
1     interface Projection2 {
2         public Point project(SphereAngles angles, Context c);
3     }
```

The above interface states that any class implementing this interface should define a function named 'project', which receives one SphereAngles instance and one Context instance, and returns an instance of the Point class.

The Point class defines an immutable object used to store the output data (a coordinate). This class may be defined as follows:

```
1     class Point {
2         private final float x;
3         private final float y;
4
5         public Point(float x, float y){
6             this.x = x;
7             this.y = y;
8         }
9
10        public float getX( ) {
11            return this.x;
```

```
12              }
13
14              public float getY( ) {
15                  return this.y;
16              }
17          }
```

This class has the same or similar functionality as the SphereAngles class, except for naming differences.

MPEG-4 Standardization

The inventors have conceived various ways of embedding the concept of projection metadata as described in this specification in a MPEG-4 standard.

For example, the invention may be embedded into MPEG-OMAF by introducing an additional projection type, which may be defined according to the provided projection metadata. Additionally, a method may be defined on how the metadata is used to perform the actual projection. For example, an API may be defined—or if the metadata is written in a scripting language, the language features—or if the metadata is embodied as a look-up table, the definition of input and output of the look-up table, etc.

A specific example is that the projection metadata may be encapsulated into existing standards from the ISO BMFF (ISO/IEC 14496-12—MPEG-4 Part 12) family.

The encoded projection metadata may be carried as sample(s) in an MPEG-4 ISOBMFF 'mdat' box. MPEG-4 Part 17 may be used to include the projection metadata encoded in raw form (e.g. UTF-8, UTF-16, ASCII) using the subtitle stream defined by this standardization document.

Instead of using raw encoding, a structured encoding (e.g. XML/JSON, binary serialization) representing the projection metadata may also be used.

MPEG-4 Part 11 defines BIFS (Binary Format for Scenes), XMT (eXtensible MPEG-4 Textual Format) and MPEG-J for the dynamic description of 3D scenes. Other standards for this purpose are 3DML(W), 3DXML and X3D. To all of these standards, an addition may be made by which a projection script, or in general the projection metadata as described in this specification, is added to the scene descriptions.

The Spherical Video V2 RFC for MP4 (ISOBMFF) and WebM (Matroska) by Google is a specification for projections. The RFC provides the structures necessary to include new projections into the standard (although non-dynamically). Currently, the defined projection methods are: multiple meshes (3D models) using standardized rendering techniques (UV-mapping), equirectangular and cube map. An extension to the WebM standard may involve introducing a new projection box, comprising a projection script or in general the projection metadata as described in this specification, and a method for using this projection metadata to perform the projection it defines.

MPEG-4 Specific Example

A specific yet non-limiting example of a MPEG standardization may be the following, which is aimed at the ISOBMFF standard ISO/IEC 23001-10.

However, a similar contribution may be made for the MPEG-2 Transport Stream standard ISO/IEC 13818-1. It is noted that the latter standard uses "access unit" instead of "sample", and "descriptor" instead of "sample entry".

```
6                          Carriage of Programmatic Projection Metadata
6.1                        Introduction
This standard specifies the carriage of Programmatic Projection Metadata (PPM) in the ISO
Base Media File Format using metadata tracks. PPM provides programmable and possibly
dynamic projection scripts to translate rectangularly encoded video frames to a 3DOF format
as specified in clause [... future clause of MPEG OMAF ...]
The PPM track shall be linked to the video track it describes by means of a 'cdsc' (content
describes) track reference.
A PPM sample in the PPM track contains a projection script. The projection script is applicable
from the time associated with the composition timestamp (ctts) of the sample until the
composition timestamp of the next PPM sample.
6.2                        Programmatic Projection Metadata
6.2.1                      Programmatic Projection Metadata Sample Entry
Sample Entry Type:         'ppmx'
Container:                 Sample Description Box ('stsd')
Mandatory:                 No
Quantity:                  0 or 1
The Programmatic Projection Metadata sample entry provides metadata about Programmatic
Projection Metadata samples.
6.2.1.1                    Syntax
The programmatic projection metadata sample entry shall be as follows:
aligned(8) class ProgrammaticProjectionMetadataSampleEntry
                    extends MetadataSampleEntry ('ppmx') {
                    ProgrammaticProjectionMetadataFullBox( )
}
aligned(8) class ProgrammaticProjectionMetadataBox
                    extends FullBox('ppm0', version = 0, flags){
                    if(version==0) {
                    unsigned int(32) entry_count;
                        for (i = 1; i <= entry_count; i++){
                            unsigned int(8) ppm_sample_length;
                            unsigned int(8) ppm_encoding;
                            unsigned int(8) ppm_programming_language;
                            unsigned int(1) ppm_is_time_dependent;
                            unsigned int(7) reserved;
                            if(ppm_is_time_dependent==1){
                                string      ppm_word_for_timestamp;
                            }
                        }}
6.2.1.2                    Semantics
version is an integer that specifies the version of this box (0 in this specification)
```

```
flags is a 24-bit integer with flags (currently all zero).
ppm_sample_length specifies the length of the PPM sample in bytes.
ppm_encoding specifies the encoding of the PPM sample. The value 0 indicates binary
encoding. The value 1 indicates UTF-8 text encoding. Values 2-127 are reserved. Values 128-
255 are user defined.
ppm_programming_language specifies the program language of the PPM sample. The value 0
indicates Python version 3.6.1 [reference]. The value 1 indicates Java version 8.121
[reference]. The value 2 indicates GLSL version 4.50 [reference]
ppm_is_time_dependent is a one-bit flag. The value 1 indicates that the PPM sample is time
dependent, that is, the PPM uses timestamp values. The value 0 indicates that there is no time
dependence of the script.
reserved are seven reserved bits, all set to 0 for the present document
ppm_word_for_timestamp is the name of the variable that is used for the timestamp used in
the
script. The recommended value is "t". It corresponds with the composition timestamp ('ctts'
box).
6.2.2                   Programmatic Projection Metadata Sample format
6.2.2.1                 Syntax
The Programmatic Projection Metadata sample shall conform to the following syntax:
aligned(8) class ProgrammaticProjectionMetadataSample ( ){
                        string programmatic_projection_metadata_sample;
                    }
6.2.2.2                 Semantics
programmatic_projection_metadata_sample contains the PPM sample. Details of this are
specified in clause [... future clause of MPEG OMAF ...].
```

Another example relates to OMAF standard ISO/IEC 23000-20. Here, the proposed changes to ISO/IEC 23000-20 clause 7.2.3 are shown, with underlining indicating additions to the clause.

```
7.2.3           Projected omnidirectional video box
7.2.3.1         Definition
                Box Type:                  'povd'
                Container:                 Scheme Information box ('schi')
                Mandatory:                 Yes, when scheme_type is equal to 'podv'
                Quantity:                  Zero or one
                    The properties of the projected pictures are indicated with the following:
    •   the projection format of the projected picture (C for monoscopic video contained in the
        track, $C_L$ and $C_R$ for left and right view of stereoscopic video),
    •   the orientation of the projection structure relative to the global coordinate axes, and
    •   the spherical coverage of the projected omnidirectional video (i.e., the area on the
        spherical surface that is represented by the projected picture).
7.2.3.2             Syntax
aligned(8) class ProjectedOmnidirectionalVideoBox extends Box('povd') {
    ProjectionFormatBox( ); // mandatory
    ProjectionOrientationBox( ); // optional
    CoverageInformationBox( ); // optional
}
aligned(8) class ProjectionFormatBox( ) extends FullBox('prfr', 0, 0) {
    ProjectionFormatStruct( );
}
aligned(8) class ProjectionFormatStruct( ) {
    bit(3) reserved = 0;
    unsigned int(5) projection_type;
}
7.2.3.3             Semantics
                    projection_type indicates the particular mapping of the rectangular decoder picture
output samples onto the spherical coordinate system specified in clause 5.1. projection_type
equal to 0 indicates the equirectanqular projection as specified in clause 5.2. projection_type
equal to 1 indicates that the projection is provided in the form of projection metadata comprising
an executable script as specified in clause [some future OMAF clause]. projection_type equal to
2 indicates that the projection is provided in the form of projection metadata comprising a lookup
table as specified in clause [some other future OMAF clause]. Other values of projection_type
are reserved.
```

Other General Aspects

The projection metadata may define a projection onto a virtual body in the form of a geometric primitive. However, the projection may also be onto a mesh.

The projection may be applied to more than one image or more than one video. For example, a projection may provide coordinate mappings for multiple input sources, or a projection may select between multiple input sources.

As a further example of dynamic behavior enabled by a projection script, the projection script may take parameters of the viewing environment into account, e.g. display width/height, viewer age, background luminance, weather, time of day, etc.

The projection script may be generated at the content source, e.g., by a camera, but also separately thereof, e.g., by an authoring workstation.

The projection script may be generated to match the projection of the source camera at any point in the recorded video.

The projection script may be defining in a programming language which is restricted to a subset of the programs defined for Turing Machines, so as to reduce complexity (e.g. support only decidable programs) and improve performance.

For projection scripts without 'side-effects', e.g. pure/atomic scripts, the coordinate mapping may be pre-calculated by evaluating these scripts in advance.

The technique of defining projections using projection metadata, and in particular a projection script, may also be applied to the encoding phase, e.g., when recorded 360° images are projected onto a rectangle by a projection.

The projection metadata may gradually adapt the projection, e.g., to focus the projection on a moving point of interest in the scene, and/or establish a gradual transition between projections, e.g., spatially or temporally. This may involve executing one or more projection scripts within a stateful execution environment.

Multiple projections scripts may be used, e.g., such that scripts can invoke and/or influence each other, such that the multiplexer decides when to run each script, such that the demultiplexer decides when to run each script, and/or such that the capabilities of the viewing environment are taken into account.

Multiple projection scripts may be concatenated, e.g., to simplify their implementation by focusing each separate script on a single issue. When multiple projection scripts are used, further optimization is possible by reducing redundant operations, e.g., by performing pairs of operations with the same effect only once.

Prior to encoding a projection script, e.g., for inclusion in a video stream, it may be optimized to improve the efficiency of the execution.

Projection metadata may define a sphere-to-plane projection instead of the plane-to-sphere projection described in various examples.

The projection metadata may be timed by using timestamps features of media containers. This may allow synchronizing with other media streams contained in such containers (e.g. video/audio streams). For example, PTS timestamps may be used for MPEG-2 containers, and CTS timestamps for MPEG-4 containers.

Figure 6:
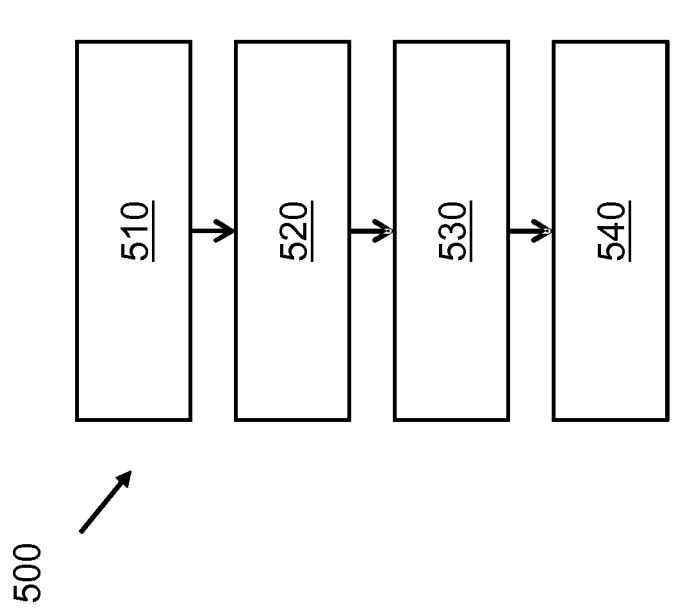
FIG. 6 shows a method of rendering using projection metadata.

FIG. 6 shows a method 500 of rendering a panoramic scene using projection metadata. The method 500 may correspond to an operation of the rendering system described with reference to FIG. 3. However, this is not a limitation, in that the method 500 may also be performed by another entity or distributed system of entities.

The method 500 may comprise, in an operation 510 titled 'OBTAINING IMAGE DATA', obtaining image data of the at least one image. The method 500 may further comprise, in an operation 520 titled 'OBTAINING PROJECTION METADATA', obtaining, via a communication interface, projection metadata associated with the image data. The projection metadata may be of a type as described in this specification. The method 500 may further comprise, in an operation 530 titled 'PROJECTING IMAGE USING PROJECTION METADATA', projecting the at least one image onto the virtual body using the coordinate mapping. The method 500 may further comprise, in an operation 540 titled 'RENDERING PANORAMIC SCENE', rendering the panoramic scene from a viewpoint within or facing the virtual body.

It will be appreciated that the above operations may be performed in any suitable order, e.g., consecutively, simultaneously, or a combination thereof, subject to, where applicable, a particular order being necessitated, e.g., by input/output relations. For example, operations 510 and 520 may be performed in parallel or sequentially.

Although not shown explicitly in the figures, a method may be provided for enabling a rendering system to render a panoramic scene which is represented by at least one image. The method may comprise, in an operation titled 'PROVIDING IMAGE DATA', providing image data of the at least one image to the rendering system. The method may further comprise, in an operation titled 'PROVIDING PROJECTION METADATA', providing projection metadata to the rendering system. The projection metadata may be of a type as described in this specification.

Each method may be implemented on a processor system, e.g., on a computer as a computer implemented method, as dedicated hardware, or as a combination of both.

Figure 7:
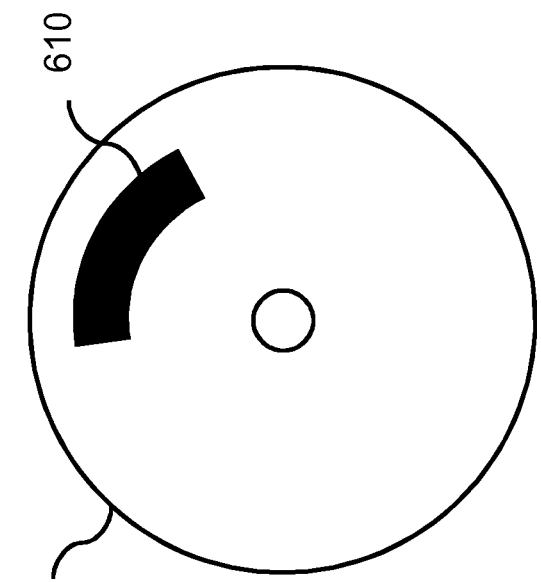
FIG. 7 shows a computer-readable medium comprising non-transitory data.

FIG. 7 shows a computer-readable medium 600. For example, instructions for the processor system, e.g., executable code, may be stored on the computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Alternatively, the computer-readable medium 600 may comprise projection metadata as described in this specification.

Figure 8:
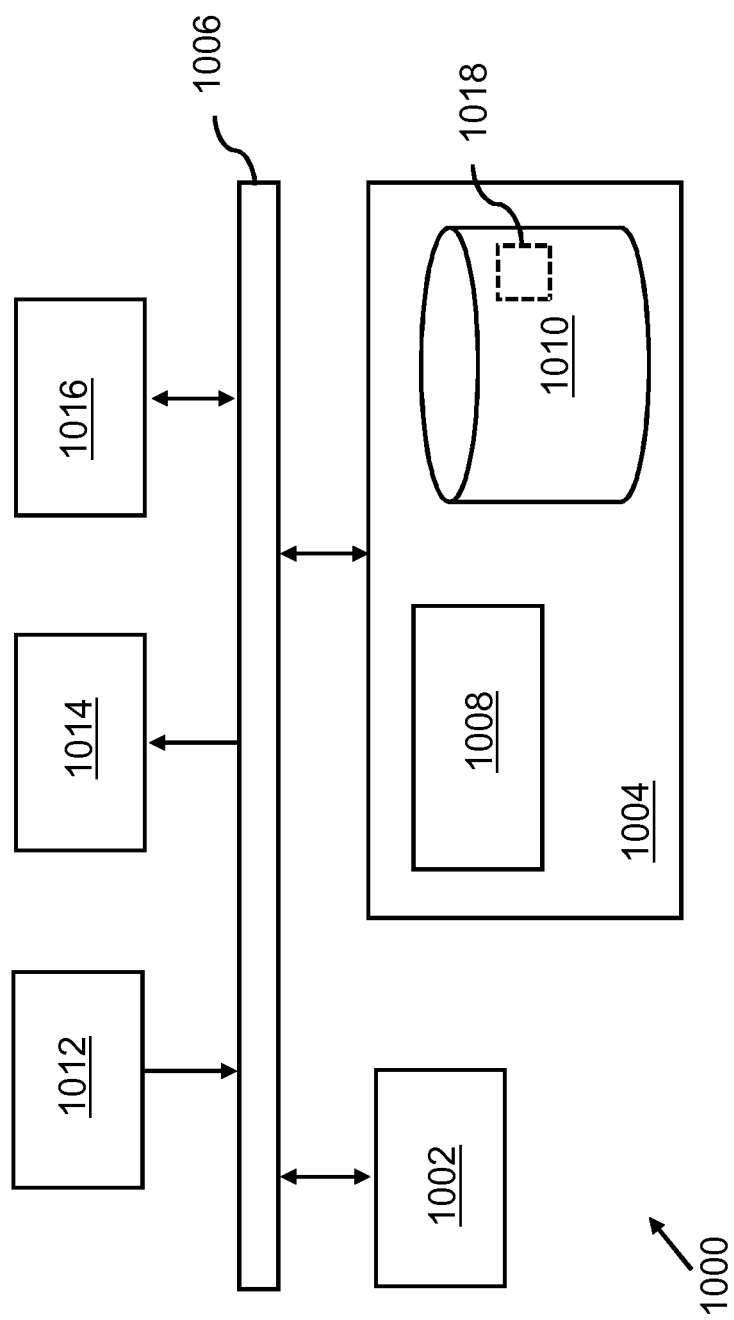
FIG. 8 shows an exemplary data processing system.

FIG. 8 is a block diagram illustrating an exemplary data processing system that may be used in the embodiments of this disclosure. Such data processing systems include data processing entities described in this disclosure, including but not limited to the projection metadata system and the rendering system. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, or the like.

Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 8, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent a projection metadata system for enabling a rendering system to render a panoramic scene. In that case, application 1018 may represent an application that, when executed, configures data processing system 1000 to perform the various functions described herein with reference to this system. In another aspect, data processing system 1000 may represent the rendering system. In that case, application 1018 may represent an application that, when executed, configures data processing system 1000 to perform the various functions described herein with reference to rendering system.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for enabling a rendering system to render a panoramic scene, wherein the panoramic scene is part of a panoramic video and is represented by at least one image, wherein the rendering system is configured to project the at least one image onto a virtual body and to render the panoramic scene from a viewpoint within or facing the virtual body, the method comprising:
providing image data of the at least one image to the rendering system;
providing projection metadata to the rendering system, the projection metadata comprising machine readable data providing a coordinate mapping to be used by the rendering system to project the at least one image onto the virtual body, the coordinate mapping being between a first coordinate system associated with the at least one image and a second coordinate system associated with the virtual body;
wherein the projection metadata provides a plurality of different projections for use with at least one of:
different types of virtual bodies;
different types of rendering techniques by which the panoramic scene is rendered;
different types of displays for which the panoramic scene is rendered; and
different temporal parts of the panoramic video.

2. The method according to claim 1, wherein the panoramic scene is part of a panoramic video, wherein the image data is part of video data of the panoramic video, and wherein the method comprises:
encoding the video data to obtain encoded video data;
formatting the encoded video data to obtain a stream;
including the projection metadata in the stream; and
providing the stream to the rendering system.

3. The method according to claim 2, wherein including the projection metadata in the stream comprises multiplexing the projection metadata with the encoded video data in the stream.

4. The method according to claim 1, wherein the projection metadata provides the plurality of different projections for further use with different spatial parts of the panoramic scene.

5. A method for rendering a panoramic scene, wherein the panoramic scene is part of a panoramic video and is represented by at least one image, the method comprising:
obtaining image data of the at least one image, wherein the image data is part of video data of the panoramic video;
obtaining, via a communication interface, projection metadata associated with the image data, the projection metadata comprising machine readable data providing a coordinate mapping to be used to project the at least one image onto a virtual body, the coordinate mapping being between a first coordinate system associated with the at least one image and a second coordinate system associated with the virtual body;
projecting the at least one image onto the virtual body using the coordinate mapping; and
rendering the panoramic scene from a viewpoint within or facing the virtual body;
wherein the projection metadata provides a plurality of different projections for use with at least one of:
different types of virtual bodies;
different types of rendering techniques by which the panoramic scene is rendered;
different types of displays for which the panoramic scene is rendered; and
different temporal parts of the panoramic video.

6. The method according to claim 5, wherein the projection metadata comprises an executable script, and wherein the method comprises executing the executable script to obtain the coordinate mapping.

7. The method according to claim 5, wherein the projection metadata provides the plurality of different projections for further use with different spatial parts of the panoramic scene.

8. A non-transitory computer-readable medium comprising a computer program, the computer program comprising instructions for causing a processor system to perform the method according to claim 1.

9. A non-transitory computer readable medium comprising projection metadata for use by a rendering system to render a panoramic scene, wherein the panoramic scene is part of a panoramic video and is represented by at least one image, wherein the rendering system is configured to project the at least one image onto a virtual body and to render the panoramic scene from a viewpoint within or facing the virtual body, wherein the projection metadata comprises machine readable data providing a coordinate mapping to be used by the rendering system to project the at least one image onto the virtual body, the coordinate mapping being between a first coordinate system associated with the at least one image and a second coordinate system associated with the virtual body;

wherein the projection metadata provides a plurality of different projections for use with at least one of:
different types of virtual bodies;
different types of rendering techniques by which the panoramic scene is rendered;
different types of displays for which the panoramic scene is rendered; and
different temporal parts of the panoramic video.

10. The computer readable medium according to claim 9, wherein the projection metadata comprises an executable script which, when executed by the rendering system, provides the coordinate mapping.

11. The computer readable medium according to claim 9, wherein the executable script is configured to calculate the coordinate mapping for a given coordinate on the fly during execution, or to pre-calculate the coordinate mapping for all coordinates upon first execution.

12. The computer readable medium according to claim 9, wherein the different temporal parts of the panoramic video are parts before and after a scene change.

13. The computer readable medium according to claim 9, wherein the projection metadata comprises a look-up table which provides the coordinate mapping.

14. The computer readable medium according to claim 13, wherein the look-up table provides a sparse coordinate mapping which is to be interpolated by the rendering system before or when projecting the at least one image onto the virtual body.

15. The computer readable medium according to claim 9, wherein the projection metadata provides the plurality of different projections for further use with different spatial parts of the panoramic scene.

16. A projection metadata system for enabling a rendering system to render a panoramic scene, wherein the panoramic scene is part of a panoramic video and is represented by at least one image, wherein the rendering system is configured to project the at least one image onto a virtual body and render the panoramic scene from a viewpoint within or facing the virtual body, the projection metadata system comprising:

a data storage storing image data of the at least one image;
a communication interface configured to provide the image data and projection metadata to the rendering system, the projection metadata comprising machine readable data providing a coordinate mapping to be used by the rendering system to project the at least one image onto the virtual body, the coordinate mapping being between a first coordinate system associated with the at least one image and a second coordinate system associated with the virtual body;

wherein the projection metadata provides a plurality of different projections for use with at least one of:
different types of virtual bodies;
different types of rendering techniques by which the panoramic scene is rendered;
different types of displays for which the panoramic scene is rendered; and
different temporal parts of the panoramic video.

17. The projection metadata system according to claim 16, wherein the projection metadata provides the plurality of different projections for further use with different spatial parts of the panoramic scene.

18. A rendering system for rendering a panoramic scene, wherein the panoramic scene is part of a panoramic video and is represented by at least one image, the rendering system comprising:

a communication interface configured to:
obtain image data of the at least one image;
obtain projection metadata associated with the image data, the projection metadata comprising machine readable data providing a coordinate mapping to be used to project the at least one image onto a virtual body, the coordinate mapping being between a first coordinate system associated with the at least one image and a second coordinate system associated with the virtual body;

a processor configured to:
project the at least one image onto the virtual body using the coordinate mapping; and
render the panoramic scene from a viewpoint within or facing the virtual body;

wherein the projection metadata provides a plurality of different projections for use with at least one of:
different types of virtual bodies;
different types of rendering techniques by which the panoramic scene is rendered;
different types of displays for which the panoramic scene is rendered; and
different temporal parts of the panoramic video.

19. The rendering system according to claim 18, wherein the projection metadata comprises an executable script, and wherein the processor is configured to execute the executable script to obtain the coordinate mapping.

20. The rendering according to claim 18, wherein the projection metadata provides the plurality of different projections for further use with different spatial parts of the panoramic scene.

* * * * *